(12) United States Patent
Zhu (10) Patent No.: US 7,557,693 B2
(45) Date of Patent: Jul. 7, 2009

(54) MULTI-FUNCTION WARNING SYSTEM FOR VEHICLE AND RELATED CONTROL METHOD

(75) Inventor: Susheng Zhu, Beijing (CN)

(73) Assignee: Beijing Times Bright China Electronics Technology Co., Ltd., Beijing (CN)

(*) Notice: Subject to any disclaimer, the term of this patent is extended or adjusted under 35 U.S.C. 154(b) by 137 days.

(21) Appl. No.: 10/557,261

(22) PCT Filed: Apr. 29, 2004

(86) PCT No.: PCT/CN2004/000428

§ 371 (c)(1),
(2), (4) Date: Jan. 29, 2007

(87) PCT Pub. No.: WO2004/103739

PCT Pub. Date: Dec. 2, 2004

(65) Prior Publication Data

US 2007/0159314 A1    Jul. 12, 2007

(30) Foreign Application Priority Data

May 25, 2003    (CN) .................................. 03 1 38016

(51) Int. Cl.
*B60Q 1/00* (2006.01)
(52) U.S. Cl. ....................................... 340/438; 340/441
(58) Field of Classification Search ................. 340/438
See application file for complete search history.

(56) References Cited

U.S. PATENT DOCUMENTS 5,825,286 A * 10/1998 Coulthard ................... 340/447
6,061,628 A * 5/2000 Hayashi et al. ............. 701/208
6,092,415 A * 7/2000 Borenius et al. ........... 73/146.2

(Continued)

OTHER PUBLICATIONS

"Principle of the Alarm System for Malfunction of Tires, Machines and Urgent Slow Down of a Vehicle," China Intelligent Transport System, Dec. 2003, pp. 51-54, vol. 12.

(Continued)

*Primary Examiner*—Toan N Pham
*Assistant Examiner*—Kerri L McNally
(74) *Attorney, Agent, or Firm*—Fenwick & West LLP (57) ABSTRACT

This is a multi-functional warning system for a vehicle and the related control method. This system is composed of a host unit and branch units. The branch unit is deposed in a tire, which includes sensor(s) for monitoring the pressure, temperature or other information about the tire; if it detected a tire in deflated high temperature or loosed status, it would generate a RF signal that would be sent to the host unit. The hosts unit deals with not only aforesaid RF signals, but also signals from acceleration sensor and signals about high-water-temp, low-oil pressure etc., a CPU processes all information and then gives a corresponding indication in voice, digital and light to warn the driver. Upon severe tire failure or high deceleration of the vehicle, the host unit send out a warning signal, make a warning light flicker to provide the follow-on vehicle with a warning, in bad weather it can turn on the warning light to guide and prevent rear-end collision. The system has advantage of giving an intelligent warning for tires, devices in the vehicle, and the trouble like high deceleration, which secure the safety of the personnel and the vehicle.

24 Claims, 3 Drawing Sheets

U.S. PATENT DOCUMENTS

| | | | |
|---|---|---|---|
| 6,175,302 B1 * | 1/2001 | Huang | 340/442 |
| 6,208,257 B1 * | 3/2001 | Choi | 340/635 |
| 6,262,657 B1 * | 7/2001 | Okuda et al. | 340/439 |
| 6,275,148 B1 * | 8/2001 | Takamura et al. | 340/442 |
| 6,278,361 B1 * | 8/2001 | Magiawala et al. | 340/438 |
| 6,396,396 B2 * | 5/2002 | Oshiro et al. | 340/442 |
| 2002/0167400 A1 * | 11/2002 | Tsujita et al. | 340/443 |
| 2002/0183904 A1 * | 12/2002 | Sakurai et al. | 701/33 |
| 2004/0227646 A1 * | 11/2004 | Henry | 340/902 |

OTHER PUBLICATIONS

"Proceedings of 8International New Transport Technology Application Conference," China Communications Press, May 2004, pp. 226-230.

Motor Trend, 2004, 1 page, vol. 2.

* cited by examiner

MULTI-FUNCTION WARNING SYSTEM FOR VEHICLE AND RELATED CONTROL METHOD

CROSS REFERENCE TO RELATED APPLICATION

The present application claims the benefit under 35 U.S.C. § 119 of the China patent application No. 03138016.6 filed on May 26, 2003 and titled "Alarm System for Malfunction of Tires, Machines and Urgent Slow Down of a Vehicle," and PCT application No. PCT/CH2004/000428 filed on Apr. 29, 2004, which applications are incorporated herein in the entirety by this reference thereto.

FIELD OF THE INVENTION

The present invention relates to an alarm system for vehicle and a method for controlling the same, particularly to an alarm system for malfunction of tires, machines and urgent slow down of a vehicle and related control method.

BACKGROUND OF THE INVENTION

With the economic development worldwide, investment in infrastructure has been increasing, which has led to great improvement in quality, dramatic mile extension and average vehicle speed on highways. As a result, countries and the residents thereof have undoubtedly benefited from these improvements. However, traffic accidents especially those caused by such vehicle malfunction as tire break and rear-end collision have also increased dramatically, which have led to huge loss of lives and assets. Statistics from the Traffic Management Branch under the Ministry of Public Security of China shows that, in China, traffic accidents in 2000 killed 93.9 thousand people with a 12% increase of 1999 in which year 83.5 thousand people were killed in traffic accidents, and traffic accidents in 2001 killed 105.9 thousand people with a 13% year-on-year increase of 2000. To make clear sense, these data can be explained as that, in the past several years, the population killed by traffic accidents is equivalent to that there were two severe air crashes of 747 flights every day in China with passengers on board all being killed, or there were a population of a small-town-size vanishing in China every year. Professionally, "mortality rate per 10 thousand vehicles" is a very important criteria illustrating traffic-safety state in a region. In 2001, this rate in China reached 15.45. All the above statistics manifests that traffic safety should be considered an important factor in the coming traffic development and should be emphasized as the top guide for individual traffic behaviors.

The Chinese patent for utility model No. CN02222006.2 published on Jan. 8, 2003 discloses a "non-contact tire detector and monitoring device" comprising sensors, an amplifier, a comparator, a display device, a keyboard and a microprocessor among others. The detector and the monitoring device communicate with each other wirelessly, hence making it possible to detect the parameters of the tires in a non-contact way. However, the system only adopts a temperature sensor and a pressure sensor operating rechargeably. Therefore, the mounting of the system is complicated and the system is easy to be damaged.

The Chinese patent application for invention No. CN1305907A filed on Jan. 14, 2000 discloses a method and a device for remote-controlled detection and remote-end display of tire conditions, wherein the device includes:

a tire pressure detecting unit disposed in each tire of a vehicle;

a monitoring unit mounted in a vehicle and connected directly or indirectly to a system power supply of the vehicle; and a remote control and display unit carried by a user for directly transferring thereto the tire pressure detected by the detecting unit or indirectly transferring the same through the monitoring unit by use of an RF transceiver and a remote control.

Accordingly, the tire pressure can be detected without entering a cab or starting the system power supply of a vehicle.

However, this device can only detect the tire pressure of a vehicle only before the vehicle is started, and hence can not send alarms during the run of the vehicle.

Another example goes to the U.S. patent application for invention No. US2003/0020604A1 published on Jan. 30, 2003 and directed to a "device for monitoring at least one parameter for a plurality of vehicle wheels". Therein, the device comprises a detector unit and a control unit, said detector unit having a transmitter unit that respectively transmits a phase-modulated or frequency-modulated signal to a central evaluation and control unit. However, this detector unit is mainly used for detecting pressures and temperatures of tires.

The PCT application of "tire sensor unit" filed on May 22, 2003 discloses a sensor unit that is able to receive energy from one side of a vehicle body in a contactless way. The functions of this sensor unit are limited to detecting tire pressures and the like and transferring information to a receiving device wirelessly.

As can be seen from the above examples of the prior art, conventional vehicle tire detecting and warning devices generally have the following disadvantages:

1. Mechanical pressure switches adopted for deflation detection lack precision and reliability;
2. Systems working in inductive charging measures are complicated in mounting and easy to be damaged;
3. Proper use of tires can not be guaranteed as data of pressure and temperature can not be displayed precisely and promptly;
4. Voice warning is not provided, whereby a driver running a vehicle may not fixate on traffic conditions ahead; and
5. Wireless warning or light warning is not provided to a following vehicle upon a sudden tire failure or high deceleration of a vehicle, for which reason, rear-end collision may easily occur.

Statistics shows that tire break and rear-end collision of vehicles account for over 60% of total traffic accidents. Reasons for tire break can be summarized into: over-high tire pressure; tire deflation; abnormal increase of tire temperature; tire loose and tire breakaway from a vehicle body. Reasons for rear-end collision can be summarized into the following accidents: a followed vehicle suddenly goes out of control due to tire breaking; a poor weather condition makes it hard to see a followed vehicle clearly; and an accident of a followed vehicle can not be notified in advance. Therefore, a multi-function alarm system for vehicle is urgently required such that the following functions can be integrated therein for protecting the safety of a driver: tire pressure/temperature/ loose monitoring, safety detection of vehicle devices, anti-rear collision and vehicle navigation in heavy weather.

SUMMARY OF THE INVENTION

To overcome one or more disadvantages of the prior art, an object of the present invention is to provide an alarm system for malfunction of tires, machines and urgent slow down of a vehicle, which is capable of monitoring abnormal vehicle conditions (such as pressures, the temperatures or loose of tires) and sending out waning message in case of emergent braking.

It is another object of the present invention to provide a warning method of an alarm system for malfunction of tires, machines and urgent slow down of a vehicle, which is able to monitor abnormal conditions of a vehicle and send out waning messages to a driver in case of emergent braking.

The technical solution of the present invention is composed of a host unit and at least one extension unit. When a vehicle provided with the multi-function alarm system of this invention is started, the at least one extension unit mounted in the tire of the vehicle performs a real-time detection through dynamic, pressure, temperature and sound wave sensors. Upon detection of deflation, a high temperature or a loose state of a tire, the system first generates and then sends out an RF signal to the host unit. The CPU of the host unit processes acceleration sensor signals and level signals representative of lack of gas, a high temperature of water, handbrake-on and battery power shortage. After further process of these signals, the host unit sends out corresponding indications in voice, text and light so as to warn the driver in time. Upon severe tire malfunction or high deceleration, the host unit sends out an RF warning signal and powers a warning light to flicker so as to warn a following vehicle. Besides, the warning light can also be used to prevent rear-end collision in case of poor visibility. Thus, the system may provide intelligent warnings to a driver on tires, devices and running states of a vehicle. Thereby the safety of both the driver and the vehicle is guaranteed.

According to one aspect of the present invention, an alarm system for malfunction of tires, machines and urgent slow down of a vehicle is provided, the alarm system comprising:

a host unit 12; and at least one extension unit 11; wherein the host unit 12 at least comprises: a processing unit 34; an acceleration sensor 39; an acceleration processor 38; an RF transceiver 31; a power supply regulator 37; and an output unit; further wherein the acceleration sensor 39 is connected to the CPU 34 through the acceleration processor 38, the input end of the power supply regulator 37 is connected to the power supply controlled by the key of the vehicle while the output end of the same is connected to the CPU 34, and the RF transceiver 31 is also connected to the CPU 34 for receiving instructions and communicating with the at least one extension unit 11;

wherein the at least one extension unit 11 at least comprises: a central processing unit (CPU) 24; a sound wave sensor 23; a transmission module 25; and power supply means; wherein the sound wave sensor 23 is connected to the CPU 24 for transmitting detection signals to the CPU 24 under the control of the latter, the power supply means is connected to the CPU 24 for supplying power to the at least one extension unit, and the transmission module 25 is connected to the CPU 24 for transmitting the detected data to the host unit 12; and wherein detection of tires, devices and high deceleration are performed during the run of a vehicle. When abnormal conditions, if any, are detected, the at least one extension unit transfers relevant data to the host unit which then analyzes and processes data from the acceleration processor and sends out warning messages to the driver.

Preferably, said at least one extension unit 11 further comprises a pressure sensor 21 for transmitting data to the host unit through the transmission module 25 when the detected tire pressure value offsets a preset pressure reference, in which case, a warning message of abnormal pressure is sent out by the host unit.

Preferably, said at least one extension unit 11 further comprises a temperature sensor for transmitting data to the host unit through the transmission module 25 when the detected tire temperature value offsets a preset temperature reference, in which case, a warning message of abnormal temperature is sent out by the host unit.

Preferably, said power supply means further comprises a reverse power supply 27 and a dynamic-state sensor 26, wherein said dynamic-state sensor controls the operation of the reverse power supply 27 so as to discontinuously supply power to the CPU 24 during the run of the vehicle.

Preferably, said dynamic-state sensor 26 is a cylindrical metal tube, inside the center of which is a spring fixed by an insulator from each end of which two poles are respectively led out. In static state, the metal tube is disconnected from the spring, while in dynamic state, the mechanism composed of the cylindrical metal tube and the spring is discontinuously conductive.

Preferably, the host unit 12 further comprises an instruction control 35, which controls the output unit through the CPU 34 for repetitively display or play recorded data.

Preferably, the host unit 12 further comprises a warning light 30 composed of either a yellow illuminant of a high-luminance LED or a flickering light. When receiving a signal for turning on the light, the warning light 30 may flash in a given frequency. Thus a warning message is sent out to a following vehicle.

Preferably, the host unit 12 further comprises a vehicle failure level input end 36 which is connected to the positive poles of the indicator lights respectively warning a high temperature of water, handbrake-on, lack of gas, and door-open. In response to any of these malfunction, a high level signal is output from the positive pole of the corresponding indicator light, and controls an output unit to output corresponding information of the failure when processed by the CPU 34 and a relevant software program. Thus, a warning message for the failure of the operation or the device of a vehicle is sent out to the driver.

Preferably, the output unit comprises a voice module 32 and a display module 33, the two of which are respectively connected to the CPU 34 for outputting warning message in either sound or text.

Preferably, the voice module 32 adopts solid-state recording devices to record sound that reads out relevant data and announces a warning message. Thus a sound database is formed in said voice module that is able to synthesize hundreds of sentences.

According to a further aspect of the present invention, an alarm system for malfunction of tires, machines and urgent slow down of a vehicle is provided, comprising: a host unit 12; and at least one extension unit 11; wherein the host unit 12 at least comprises: a central processing unit (CPU) 34; an acceleration sensor 39; an acceleration processor 38; an RF transceiver 31; a power supply regulator 37; an warning light 30; an instruction control 35; and an output unit; further wherein the acceleration sensor 39 is connected to the CPU 34 through the acceleration processor 38, the input end of the power supply regulator 37 is connected to the power supply controlled by the key of the vehicle while the output end of the same is connected to the CPU 34, and the RF transceiver 31 is also connected to the CPU 34 for receiving instructions and communicating with at least one extension unit, the instruction control 35 is connected to the CPU 34 and controls the output unit to repetitively display or play the recorded data, and the warning light 30 is connected to the CPU 34 and flashes in a given frequency when receiving a signal for turning on the light from the CPU 34;

and wherein the extension units at least comprises: a central processing unit (CPU) 24; a sound wave sensor 23; a transmission module 25; power supply means; a pressure sensor 21; and a temperature sensor 22; further wherein the sound wave sensor 23 is connected to the CPU 24 for transmitting detection signals to the CPU 24 under the control of the CPU 24, the power supply means is connected to the CPU 24 for supplying power to the at least one extension unit, the transmission module 25 is connected to the CPU 24 for transmitting the detected data to the host unit 12, the pressure sensor 21 is connected to the CPU 24 for transmitting data to the host unit through the transmission module 25 when the detected tire pressure value offsets a preset pressure reference, and the temperature sensor 22 is for transmitting data to the host unit through the transmission module 25 when the detected tire temperature value offsets a preset temperature reference, and wherein detection to the malfunction of tires, devices and high deceleration of a vehicle are performed in a dynamic status of the vehicle. When abnormity, if any, is detected, the at least one extension unit will transfer relevant data to the host unit which then analyzes and processes data from the acceleration processor and send out warning messages to the driver.

According to a further aspect of the present invention, a warning method for an alarm system for malfunction of tires, machines and urgent slow down of a vehicle is provided, which comprises the steps of:

(a) setting various parameters for the host unit 12 and the at least one extension unit 11 and initializing the reference tire pressure for the tire provided with the at least one extension unit 11 after the vehicle is started;

(b) enabling the CPU 24 of the at least one extension unit 11 to periodically access at least one of the pressure sensor, the temperature sensor and the sound wave sensor and then analyze the accessed data so as to control the transmission module 25 to transmit the data to the host unit 12 when the data is found abnormal; and (c) enabling the host unit 12 to receive data from the at least one extension unit 11 and analyze data respectively from the acceleration processor 38 and the vehicle failure level input end so as to control the output unit to send out a warning message when the data received is found abnormal.

Preferably, the step (a) further comprises a substep in which the CPU 34 of the host unit 12 writes the pressure data measured through the first 2 to 4 times by each extension unit to a memory. The written data is used as reference pressures for corresponding tires.

Preferably, the pressure data of each tire is measured three times.

Preferably, a self-detection step follows the step (a), such that each extension unit 11 will transfer a pressure data to the host unit 12 for self-detection after the first several starting minutes of the vehicle.

Preferably, the method further comprises a step according to which the reverse power supply 27 of the at least one extension unit 11 still supplies power for a delayed time period after the vehicle stops. Thereafter, the power supply is stopped.

Preferably, the method further comprises a step according to which the host unit 12 controls the following functions through corresponding keys on the instruction control 35: repeatedly displaying text data, repeatedly playing sound data, manually opening/closing the warning light, and selecting tire sequence numbers.

Preferably, the method further comprises a step according to which the sound wave sensor 23 of the at least one extension unit 11 transmits the vibration signals of the detected tire to the CPU 24 which further compares the received vibration signals with the pre-stored data so as to judge whether the tire is loose. If the tire is loose, the CPU 24 controls the transmission module 25 to send high speed warning data to the host unit. Thus, the detection of a tire loose failure is achieved.

Preferably, the method further comprises a step according to which the CPU 24 of the at least one extension unit 11 switches from a standby state to a working state every second utilizing a watch dog. In working state, the CPU accesses the pressure sensor 21, the temperature sensor 22 and the sound wave sensor 23 respectively so as to detect whether the data therefrom are within a normal range, and to control the transmission module 25 to send warning data to the host unit when abnormal data is detected.

Preferably, the method further comprises a step according to which the acceleration sensor 39 with high sensibility of the host unit 12 dynamically monitors a high deceleration failure through the acceleration processor 38 and relevant software programs, and sends abnormal signals, if any, to the CPU 34 that will control the RF transceiver 31 and the warning light 30 to warn a following vehicle. The warning will be canceled when the failure is removed.

Preferably, the output unit comprises a voice module 32 and a display module 33, the two of which are respectively connected to the CPU 34 for outputting warning data in either sound or text.

Preferably, the method further comprises a step according to which the voice module 32 sends out voice alarms of different dangers, pressure data and temperature data under the control of the CPU 34 of the host unit 12 and relevant software programs. Thus, the driver will hear different information needed.

The present invention has the following advantages.

RF high speed data encoding/decoding transmission is adopted in the communication between the host unit and the at least one extension unit according to the present invention which also involves a software program for data correcting and a function of automatic warning for radio co-frequency interference. Accordingly, time occupancy of a channel for data receiving and transmitting is reduced, whereby the use-efficiency of frequency is improved and the dynamic warning reliability is enhanced.

Comprehensive and intelligent warming of malfunction regarding tires, devices and high deceleration of a vehicle is realized as the at least one extension unit and the host unit according to the present invention are capable of detecting difference sensors. As a result, the life of the vehicle is extended as long as possible, the oil exhausting volume is reduced and the safety and comfort of the vehicle are guaranteed.

According to the present invention, the CPU of the host unit and relevant software programs will control the RF transceiver and the warning light to warn a following vehicle when a failure is detected and will automatically cancel the warning when the failure is removed; meanwhile, the warning light can be also manually turned on/off. Thus, vehicles can be navigated in foggy weather and rear-end collision can be prevented.

According to the present invention, the voice module sends out sound warnings of dangers, pressure and temperature under the control of the CPU 34 of the host unit 12 and relevant software programs. Thus the driver can hear all relevant information while fixating traffic conditions ahead.

The at least one extension unit according to the present invention is mounted to each desired tire of a vehicle, in the first three times' run of which, the host unit will receive the self-detected pressure data of each tire and write the received data to an EEROM as a standard pressure of each corresponding tire (i.e. a reference tire pressure for the system of the present invention), such that the system of the present invention is adaptable for tire warning of different types of vehicles.

The at least one extension unit according to the present invention is automatically controlled by using a dynamic-state sensor to control the reverse power supply, whereby is still supplied with power for delayed several minutes after the tire starts or stops running. Thereafter, the power supply is stopped, and no power is consumed if the vehicle is stopped for over said several minutes. As a result, the life of each cell in the extension unit(s) may exceed 5 years.

The CPU and relevant software programs of the at least one extension unit according to the present invention transfers pressure data to the host unit after several minutes' run of a vehicle; upon reception of the data, the host unit determines whether the data from different extension units is received. Thus the self-detection step is finished and the safety of the vehicle is guaranteed.

DETAILED DESCRIPTION OF THE PREFERRED EMBODIMENTS

The foregoing and other objects, functions and advantages of the present invention will be clearly described in the following detailed description in connection with the drawings.

In the embodiment of the present invention, a four-wheel vehicle is exemplified. However, the embodiment herein shall not be regarded as a limitation to the present invention. In stead, the present invention is applicable to all vehicles with tire(s), including motors, tricycles, sedans, multi-wheeled vans and other vehicles for carrying purpose.

Figure 1:
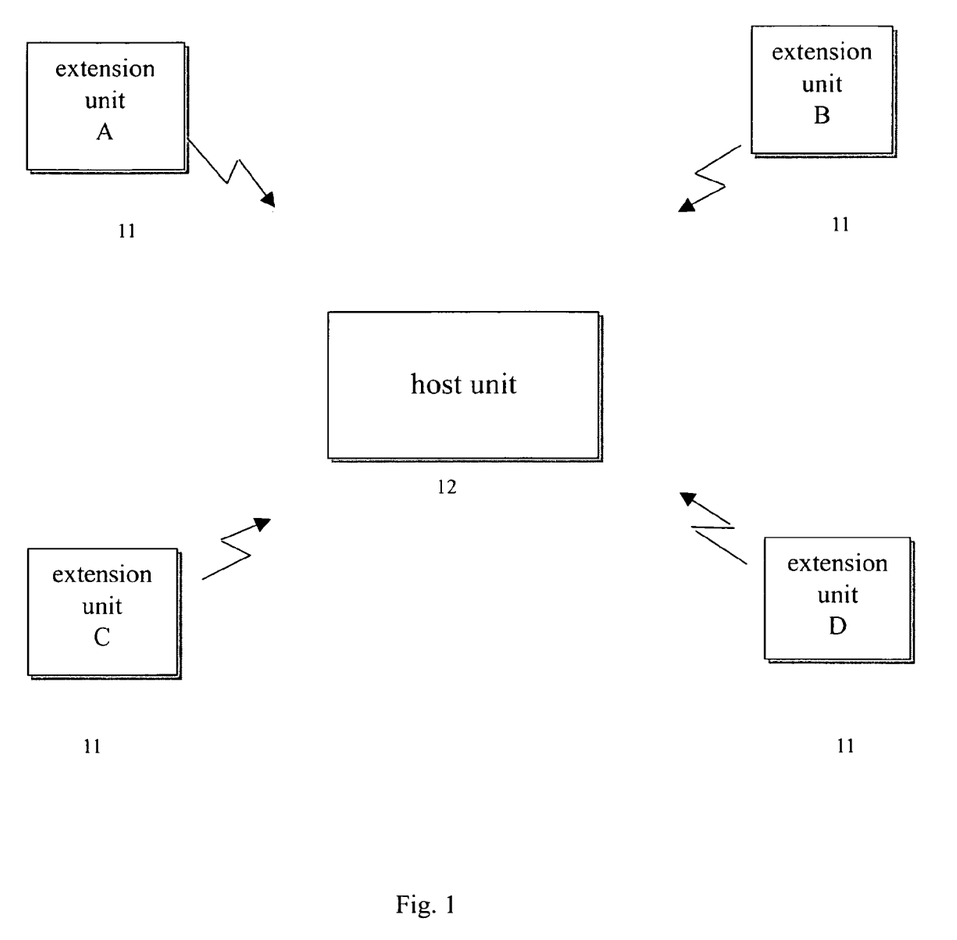
FIG. 1 is a schematic block diagram of the multi-function system for vehicle of the present invention

Referring now to FIG. 1, which is a schematic block diagram of the alarm system for failures of tires, machines and urgent slow down of a vehicle according to the present invention. As shown in FIG. 1, the system comprises a host unit 12 and at least one extension unit 11. Further, the host unit 12 is mounted in the cab while the at least one extension unit 11 is fixed on the inner steel circle of each tire. The host unit and the at least one extension unit communicate with each other wirelessly.

Figure 2:
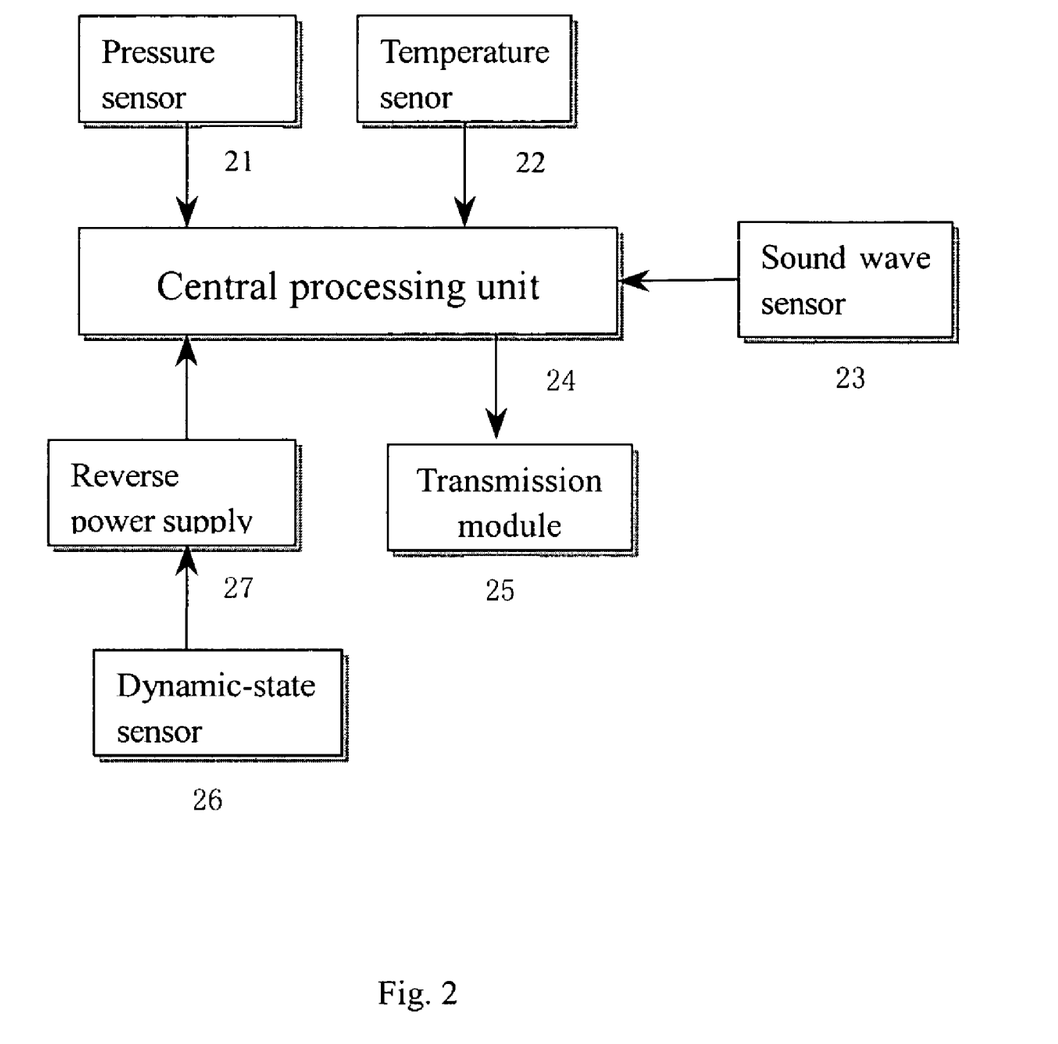
FIG. 2 is a schematic block diagram showing the specific connection of components in the at least one extension unit 11 of the multi-function system for vehicle of the present invention.

FIG. 2 is a block diagram showing the specific connection of components in the at least one extension unit 11 of the alarm system for vehicle according to the present invention. As shown in FIG. 2, the at least one extension unit 11 comprises:
 a pressure sensor 21;
 a temperature sensor 22;
 a sound wave sensor 23;
 a central processing unit (CPU) 24;
 a transmission module 25;
 a dynamic-state sensor 26; and
 a reverse power supply 27;
 wherein the CPU 24 is a main control module that controls the pressure sensor 21, the temperature sensor 22, the sound wave sensor 23 and the transmission module 25, while the pressure sensor 21, the temperature sensor 22, the sound wave sensor 23 and the transmission module 25 are respectively connected to the CPU 24 for communicating with the CPU 24, receiving instructions and transmitting information; the dynamic-state sensor 26 is connected to the reverse power supply 27 for controlling the working state of the reverse power supply 27 to supply power discontinuously; and the CPU 24 is also connected to the reverse power supply 27 such that the CPU 24 may power any one of the pressure sensor 21, the temperature sensor 22, the sound wave sensor 23 and the transmission module 25 during the power supply period of the reverse power supply 27.

Figure 3:
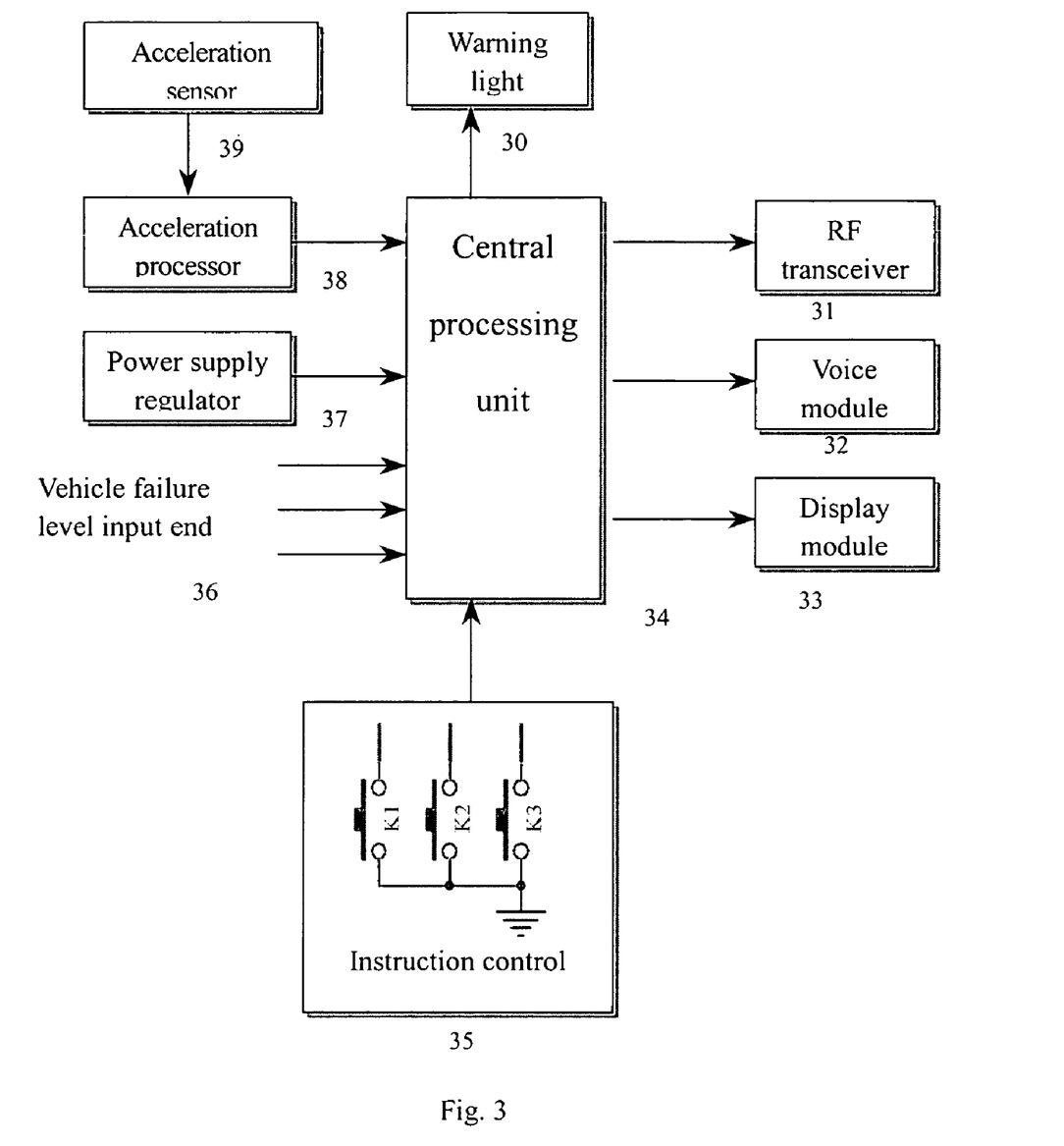
FIG. 3 is a schematic block diagram of host unit of the multi-function system for vehicle of the present invention.

FIG. 3 is a block diagram of alarm system for failures of tires, machines and urgent slow down of a vehicle according to the present invention. As can be seen from FIG. 3, the host unit 12 comprises:
 a warning light 30;
 an RF transceiver 31;
 a voice module 32;
 a display module 33;
 a central processing unit (CPU) 34;
 an instruction control 35;
 a vehicle failure level input end 36;
 a power supply regulator 37;
 an acceleration processor 38; and
 an acceleration sensor 39;
 wherein the acceleration sensor 39 is connected to the CPU 34 through the acceleration processor 38; the input end of the power supply regulator 37 is connected to the power supply controlled by the key of the vehicle while the output end of the same is connected to the CPU 34; the RF transceiver 31 is also connected to the CPU 34 for receiving instructions and transmitting data; additionally, the voice module 32, the display module 33, the warning light 30 and the instruction control 35 are respectively connected to the CPU 34 for receiving instruction input from a user and outputting sound warnings, light warnings and data display under the control of the CPU 34.

With reference to FIGS. 1-3, the control process and running process of each element in the at least one extension unit will be respectively described as follows.

According to the present invention, there is provided a warning method of an alarm system for malfunction of tires, machines and urgent slow down of a vehicle mainly including the steps of:
 setting parameters for the host unit 12 and the at least one extension unit 11 and initializing the reference tire pressure for the tire provided with the at least one extension unit 11 after the vehicle is started;
 enabling the CPU 24 of the at least one extension unit 11 to periodically access at least one of the pressure sensor, the temperature sensor and the sound wave sensor and then analyze the accessed data so as to control the transmission module 25 to transmit the data to the host unit 12 when the data is found abnormal; and enabling the host unit 12 to receive data from the at least one extension unit 11 and analyze data respectively from the acceleration processor 38 and the vehicle failure level input end so as to control the output unit to send out a warning message when the data received is found abnormal.

The dynamic-state sensor 26 is a cylindrical metal tube, inside the center of which is a spring fixed by an insulator from each end of which two poles are respectively led out. In static state, the metal tube is disconnected from the spring, while in dynamic state, the mechanism composed of the cylindrical metal tube and the spring is discontinuously conductive for charging the control capacitor (not shown) at the operating end of the reverse power supply 27 through a current-limiting resistor. When the capacitor is fully charged, the reverse power supply 27 is operated to supply power to the CPU 24. Thus, power supply to the at least one extension unit 11 is delayed for several minutes when the tire of the vehicle starts or stops running. Thereafter, no power is consumed if the vehicle is stopped for a long time. As a result, the extension unit 11 is automatically switched on and off. That the current-limiting resistor is adopted as a delay switch for charging the control capacitor at the operating end of the reverse power supply 27 is to prevent vibrations that may cause frequent turning on/off of the dynamic-state sensor 26, which in turn may lead to CPU 24 is frequently powered on/off.

When the reverse power supply 27 is in operation, the CPU 24 of the at least one extension unit 11 switches from a standby state to a working state every second utilizing the reset function of a watch dog. In working state, the CPU accesses the pressure sensor 21, the temperature sensor 22 and the sound wave sensor 23 respectively so as to detect whether the data therefrom are within a normal range and to transfer high speed warning data to the host unit by controlling the transmission module 25 when abnormal data is detected, wherein said high speed is greater than 19.2 K bit/s. As a result, power is consumed at a low level and hence is saved.

When the reverse power supply 27 is in operation, the pressure sensor 21 transmits the detected analog data of tire pressures to the CPU 24 which first converts the received analog data to digital data, then compares the converted digital data with the last stored data of tire pressures, and finally calculates the difference between the converted date and the stored data. If the difference exceeds a preset threshold, the CPU 24 controls the transmission module 25 to send warning data to the host unit 12, thereby the detection of tire pressure change is realized. For example, when the pressure sensor 21 detects a tire pressure change not less than $\frac{1}{5}$ of the reference tire pressure, the CPU 24 controls the transmission module 25 to send a message of "over-sufficient tire pressure" to the host unit; when the pressure sensor 21 detects a difference is $\frac{1}{7}$ to $\frac{1}{5}$ of the reference tire pressure, the CPU 24 controls the transmission module 25 to send a message of "tire deflation" to the host unit; when the pressure sensor 21 detects a difference is $\frac{1}{5}$ to $\frac{1}{3}$ of the reference tire pressure, the CPU 24 controls the transmission module 25 to send a message of "insufficient tire pressure" to the host unit; and when the pressure sensor 21 detects a difference less than $\frac{1}{3}$ of the reference tire pressure, the CPU 24 controls the transmission module 25 to send a message of "low tire pressure" to the host unit.

Additionally, when the reverse power supply 27 is in operation during the first minutes' run of a vehicle, the CPU 24 accesses the pressure sensor 21 in conjunction with relevant programs so as to transmit data of tire pressure to the host unit 12 that further processes the received data. Thus self-detection of the at least one extension unit 11 is achieved.

When the reverse power supply 27 is in operation, the temperature sensor 22 transmits the detected analog data of tire temperature to the CPU 24 which first compares the received data with the data of tire temperature stored minutes ago, and then determines whether the tire temperature increases too fast. If the tire temperature increases too fast or if the temperature exceeds a preset temperature value, the CPU 24 controls the transmission module 25 to send warning data to the host unit 12, thereby the detection of high tire temperature is realized. For example, when the temperature sensor 22 detects a tire temperature increment that is over 10° C. higher than that measured 5 minutes ago, the CPU 24 controls the transmission module 25 to send a warning message of "fast increment of tire temperature" to the host unit; when the temperature sensor 22 detects a tire temperature over 70° C., the CPU 24 controls the transmission module 25 to send a warning message of "over-high tire temperature" to the host unit; and when the temperature sensor 22 detects a tire temperature over 80° C., the CPU 24 controls the transmission module 25 to send a warning message of "super-high tire temperature" to the host unit.

When the reverse power supply 27 is in operation, the sound wave sensor 23 transmits the detected analog data of tire vibration to the CPU 24 which first converts the received analog data to digital data, then compares the converted digital data with the stored data of tire vibration, and finally determines whether the tire is loose. If the tire is loose, the CPU 24 controls the transmission module 25 to send warning data to the host unit 12. Thus, after comprehensive analysis of the host unit, the detection of tire loose is realized. For example, first of all, different vehicle vibration frequencies and magnitudes are stored by simulation of different traffic conditions, and then a relevant database is established and stored in the host unit. During the run of the vehicle, the CPU of the at least one extension unit transmits the data detected by the sound wave sensor to the host unit through the transmission module; then the CPU 34 of the host unit analyses the data from the sound wave sensor in each tire: if the data from a tire is apparently different from the vibration data stored for the same tire in several continued times of detection (for example, 3-5 times), the tire is determined as loose; and if the tire remains the same vabrication frequency or magnitude at the same time instance or during the same time period, the CPU 34 does not send out any warning message.

The control and running processes of each element in the host unit will be respectively described as follows.

The input end of the power supply regulator 37 is connected the power supply controlled by the key of the vehicle to regulate the output voltage of the power supply when the vehicle starts; meanwhile, if the CPU 34 detects dramatic voltage decrease of the battery during vehicle-starting, it will control the voice module 32 to send out a voice message of "battery power shortage". Thus, the detection and warning of the battery is realized. For example, when the power supply voltage in the host unit decreases from DC 12V to DC 7-8V, the CPU 34 sends out a warning message of "battery power shortage"; and when the power supply voltage in the host unit is lower than DC 7-8V, the CPU 34 sends out a warning message of "battery failure".

Both the RF transceiver 31 and the transmission module 25 of the extension unit 11 adopt hardware with high speed rate of 19.2 K bit/s and low power consumption. The high speed RF data transmission of different warning messages is comprehensively realized by the CPU 34 of the host unit, the CPU 24 of the at least one extension unit 11 and specific data correcting software for high speed data encoding/decoding. With the aid of relevant software programs, the CPU 34 is capable of automatically warning for co-frequency interference. Thus, the anti-interference ability and using efficiency of a frequency is enhanced.

The acceleration sensor 39 with high sensibility dynamically monitors the high deceleration failure of the vehicle in conjunction with the acceleration processor 38 and relevant software program. If a high deceleration failure is detected, relevant signals are sent to the acceleration processor 38 which in turn analyzes the signals and then transmits the analyzed signals to the CPU 34 which further controls the RF transceiver 31 and the warning light 30 to warn a following vehicle. The warning will be automatically canceled when the failure is removed. Thus, the detection of a high deceleration failure and moving state of a vehicle is realized. For example, when the acceleration of high deceleration is larger than 5.6 m/s$^2$, the CPU 34 will send out a message of "high deceleration" to call the driver's attention through both the voice module and the display module.

The voice module 32 comprises a solid recording device which records sound that reads out relevant data and announces a warning message. Thus a sound database is formed in said voice module able to synthesize hundreds of sentences. With the aid of relevant programs, the CPU 34 controls the voice module 32 and the display module 33 to send out voice messages and text messages of different warnings, pressures and temperatures to the driver who can thereby hear and see different information.

The vehicle failure level input end 36 is connected to the signal lines of the indicator lights respectively indicating such information as high water temperature, handbrake-on, lack of gas and door open etc. In response to any of these malfunction, a high/low level signal is output through the signal line of a corresponding indicator light. When processed by the CPU 34 and relevant software programs, the level signal next controls the sound module 32 to output corresponding information of the failure. Thereby, warning of an operational or a device failure of the vehicle is realized. For example, when an indicator light of the vehicle outputs a low level level (e.g. DC 0-2 V), the CPU 34 controls the voice module 32 and the display module 33 to send out a warning message with the aid of relevant software programs, wherein the warning message might be such voice and text information as "high water temperature", "handbrake-on", "lack of gas and door open", "low gas pressure" and the like.

Also a self-correction function is adopted in the present invention after a extension unit is mounted to a tire of a vehicle. That is, an initial tire pressure value is set according to different tires used in different vehicles. Thus, pressure data of tire obtained through self-detection is received by the RF transceiver 31 of the host unit 12 and then is written into a memory EEROM by the CPU 34 as corresponding reference tire pressure data, thereby the standard tire pressure of a specific vehicle is stored in the system of the present invention at the first 2-4 times (preferably 3 times) normal runs (i.e., the at least one extension unit 11 is energized, and the pressure data from the at least one extension unit 11 may be received in a few minutes) of the vehicle. As a result, when the system is mounted in different types of vehicles, initial values of tire pressures are self-generated through initialization rather than resetting initial values of the software program(s).

The warning light 30, might be a high-luminance LED, a laser light or a flickering light. When receiving a signal for turning on the light from the CPU 34, the warning light flashes in a given frequency. Thus a warning message is sent out to a following vehicle. Also, the warning light 30 may be separated from the host unit.

Of the keys on the instruction control 35, K1 is for sound play, K2 is for selection and K3 is for confirmation. If pressing K1, the last received tire data is repetitively displayed by text and played by sound and a indicator light indicating the position of the corresponding tire is turned on; if further pressing K1 on this basis, the second last tire data is displayed by text and played by sound; in this way, tire data received in the last four times can be displayed and played in sequence. If pressing K3 while sound playing, the display module 33 will display "F01", which indicates that the system is waiting for tire sequencing. Then, by pressing K2 within 3 seconds, tire numbers of "F02", "F03", "F04", "F05", "F06" and "F01" are circularly displayed on the screen and mated to a specific tire by pressing K3 again to be memorized. In this way, the tire data is respectively displayed and played and the tires are sequenced with numbers.

The CPU 34 and relevant software programs in the system of the present invention store the following data as defaults: Front left tire F01 (marked in red), front right tire F02 (marked in green), rear right tire F03 (marked in blue), rear left tire F04 (marked in yellow), rear left inner tire F05 (marked in black) and rear right inner tire F06 (marked in white). If the at least one extension unit of the system of the present invention is mounted in correspondence to these defaults, the host unit can be directly used without further reset.

When a vehicle provided with the system of the present invention reaches a certain speed, the dynamic-state sensor in the at least one extension unit 11 controls the reverse power supply to automatically supply power. Thus, the at least one extension unit 11 may perform real-time detection through the pressure sensor, the temperature sensor and the sound wave sensor. In the case that deflation, high temperature or loose-state of a tire is detected, an RF signal is generated and transmitted wirelessly to the host unit 12 which, upon receipt of all the data, processes signals from its acceleration sensor and high/low level signals indicating the state of lack of gas, high water temperature, handbrake-on, or power shortage of battery. The CPU 34 of the host unit 12 further processes and then delivers a corresponding indication in voice, text and light to warn the driver instantly for the sake of safety. Upon a sever tire failure or high deceleration, the host unit 12 sends out an RF warning signal and drives a warning light to flicker to warn a following vehicle, said warning light being also able to guide a vehicle in heavy weather with poor visibility and prevent rear-end collision. Thus, the system of the present invention provides an intelligent warning of tires, devices and high deceleration of a vehicle, by which the safety of the driver and/or passengers and the vehicle is guaranteed.

As described above, the present invention provides an alarm system for malfunction of tires, machines and urgent slow down of a vehicle, which comprises pressure sensors, temperature sensors, sound wave sensors, dynamic-state sensors, acceleration sensors as well as modules for instruction control, voice and display. However, the present invention is not limited to a system with such a structure. A person skilled in the art can add or remove any sensor or other module as required.

Preferably, the at least one extension unit 11 of the present invention may only comprise a sound wave sensor 23, or a sound wave sensor 23 and a pressure sensor 21, or a sound wave sensor 23 and a temperature sensor 22. Specific configuration is flexible upon the requirement of a user.

Preferably, the RF transceiver 31 or, the transmission module 25 in either the host unit 12 or the at least one extension unit 11 of the present invention is operated in a co-frequency mode. But in real practices, they may also be operated in other mode such as double-channel duplex mode or double-channel simplex mode.

Preferably, the power supply means of the present invention, which is composed of the reverse power supply 27 and the dynamic-state sensor 26, may also be realized in other manners. For example, a switch-like element may be used to control the discontinued power supply of the reverse power supply 27.

Preferably, the sensors in the at least one extension unit 11 of the present invention may be composed of separate devices such as an independent pressure sensor 21, an independent temperature sensor 22 or an independent sound wave sensor 23, or may be an integrated element, so long as it can fulfill the detection functions of the present invention.

Preferably, the elements in the host unit 12 of the present invention may be adopted as required. For example, a user may determine that only an acceleration sensor and an acceleration processor are connected to the CPU 34, then the output unit, such as voice module 31 or display module 33, is connected, and the CPU 34 communicates with the at least one extension unit 11 through the RF transceiver 31 for collecting and analyzing data from the at least one extension unit 11 and then sending out warning messages.

RF high speed data encoding/decoding transmission is adopted in the communication between the host unit and the at least one extension unit according to the present invention which also involve a software program for data correcting and a function of automatic warning for radio co-frequency interference. Accordingly, time occupancy of a channel for data receiving and transmitting is reduced, whereby the use-efficiency of frequency is improved and the dynamic warning reliability is enhanced.

The at least one extension unit and the host unit of the present invention are capable of detecting various sensors, thus comprehensive and intelligent warming to vehicle malfunction involving tires, devices and high deceleration is achieved. As a result, the life of the vehicle is extended as long as possible, the oil consumption volume is reduced and the safety and comfort of the vehicle are guaranteed.

The CPU of the host unit and relevant software programs of the prevent invention control the RF transceiver and the warning light to warn a following vehicle when any failure is detected and will automatically cancel the warning when the failure is removed. Meanwhile, the warning light can also be manually turned on/off. Thus, vehicles may be navigated in foggy weather and rear-end collision may be prevented.

The voice module of the present invention sends out sound warning of dangers, pressures and temperatures under the control of the CPU of the host unit and relevant software programs. Thus the driver may hear all relevant information while fixating traffic conditions ahead.

The at least one extension unit of the present invention is mounted to each desired tire of a vehicle, in the first three times' run of which, the host unit receives the self-detected pressure data of each tire and write the received data to an EEROM as a standard pressure of each corresponding tire (i.e. a reference tire pressure for the system of the present invention), such that the system of the present invention is adaptable for tire warning of different types of vehicles.

The at least one extension unit of the present invention automatically controls the reverse power supply through a dynamic-state sensor, whereby the system of the present invention may still supply power for a delayed several minutes after the tire starts or stops running. Thereafter, the power supply is stopped, and no power is consumed if the vehicle is stopped for more than said several minutes. As a result, the life of each cell in the at least one extension unit may exceed 5 years.

The CPU and relevant software programs of the at least one extension unit of the present invention transfer pressure data to the host unit after several minutes' run of a vehicle; upon reception of the data, the host unit determines whether the data from different extension units is received. Thus the self-detection step is finished and the safety of the vehicle is guaranteed.

The present invention is presented above by reference of the preferred embodiments. However, those skilled in the art should understand that the form and details of this invention can be modified without departing from the spirit and scope of the claims appended of the present application. Any variation, modification or equivalent substitution of the present invention should be embraced by the scope of the Claims of the present invention.

What is claimed is:

1. A multi-function alarm system for vehicle comprising a host unit (12) and at least one extension unit (11),
   wherein the host unit (12) at least comprises:
   a central processing unit (CPU) (34);
   an acceleration sensor (39);
   an acceleration processor CPU(38);
   an RF transceiver (31);
   a power supply regulator (37); and
   an output unit (32, 33);
   further wherein the acceleration sensor (39) is connected to the CPU (34) through the acceleration processor CPU (38), an input end of the power supply regulator (37) is connected to a power supply controlled by a key of the vehicle while an output end of the same is connected to the CPU (34), and the RF transceiver (31) is also connected to the CPU (34) for receiving instructions and communicating with the at least one extension unit (11);
   wherein the at least one extension unit (11) at least comprises:
   a central processing unit (CPU) (24);
   a sound wave sensor (23);
   a transmission module (25); and
   power supply means (26, 27), said power supply means comprises a reverse power supply (27) and a dynamic-state sensor (26);
   wherein said dynamic-state sensor controls the operation of the reverse power supply (27) so as to discontinuously supply power to the CPU (24) during the run of the vehicle;
   further wherein the sound wave sensor (23) is connected to the CPU (24) for transmitting detection signals to the CPU (24) under the control of the CPU (24), the power supply means (26, 27) is connected to the CPU (24) for supplying power to the at least one extension unit, and the transmission module (25) is connected to the CPU (24) for transmitting detected data to the host unit (12); and
   wherein detection of tires, devices and high deceleration are performed during the run of a vehicle, and when abnormal conditions, if any, are detected, the at least one extension unit transfers relevant data to the host unit which then analyzes and processes data from the acceleration processor and sends out warning messages.

2. The system according to claim 1, wherein said at least one extension unit (11) further comprises a pressure sensor (21) for transmitting data to the host unit through the transmission module (25) when a detected tire pressure value offsets a preset pressure reference, in which case, a warning message of abnormal pressure is sent out by the host unit.

3. The system according to claim 2, wherein said at least one extension unit (11) further comprises a temperature sensor for transmitting data to the host unit through the transmission module (25) when a detected tire temperature value offsets a preset temperature reference, in which case, a warning message of abnormal temperature is sent out by the host unit.

4. The system according to claim 1, wherein said dynamic-state sensor (26) is a cylindrical metal tube, inside the center of which is a spring fixed by an insulator from each end of which two poles are respectively led out; in static state, the metal tube is disconnected from the spring, while in dynamic state, a mechanism composed of the cylindrical metal tube and the spring is discontinuously conductive.

5. The system according to claims 1, wherein said host unit (12) further comprises an instruction control (35), which controls the output unit (32, 33) through the CPU (34) to repetitively display or play recorded data.

6. The system according to claims 1, wherein said host unit (12) further comprises a warning light (30) composed of a high-luminance LED, a laser light or a flickering light, said warning light flashing in a given frequency when receiving a signal for turning on the light from the CPU (34), thus sending out one of said warning messages to a following vehicle.

7. The system according to claim 1, wherein said output unit (32,33) comprises a voice module (32) and a display module (33), the two of which are respectively connected to the CPU (34) for outputting said warning message in either sound or text.

8. The system according to claim 7, wherein said voice module (32) comprises solid-state recording devices to record sound that reads out relevant data and announces said warning message, whereby a sound database is formed in said voice module that is able to synthesize hundreds of sentences.

9. A multi-function alarm system for vehicle comprising a host unit (12) and at least one extension unit (11),
wherein the host unit (12) at least comprises:
a central processing unit (CPU) (34);
an acceleration sensor (39);
an acceleration processor CPU(38);
an RF transceiver (31);
a power supply regulator (37); and
an output unit (32, 33);
further wherein the acceleration sensor (39) is connected to the CPU (34) through the acceleration processor CPU (38), an input end of the power supply regulator (37) is connected to a power supply controlled by a key of the vehicle while an output end of the same is connected to the CPU (34), and the RF transceiver (31) is also connected to the CPU (34) for receiving instructions and communicating with the at least one extension unit (11);
wherein the at least one extension unit (11) at least comprises:
a central processing unit (CPU) (24);
a sound wave sensor (23);
a transmission module (25); and
power supply means (26, 27);
further wherein the sound wave sensor (23) is connected to the CPU (24) for transmitting detection signals to the CPU (24) under the control of the CPU (24), the power supply means (26, 27) is connected to the CPU (24) for supplying power to the at least one extension unit, and the transmission module (25) is connected to the CPU (24) for transmitting detected data to the host unit (12);
wherein detection of tires, devices and high deceleration are performed during the run of a vehicle, and when abnormal conditions, if any, are detected, the at least one extension unit transfers relevant data to the host unit which then analyzes and processes data from the acceleration processor and sends out warning messages; and
wherein said host unit (12) further comprises a vehicle failure level input end (36) which is connected to positive poles of indicator lights respectively warning failures of high temperature of water, handbrake-on, lack of gas, and door-open; further in response to any of said failures, a high/low level signal is output from the positive pole of the relevant indicator light, which controls the output unit (32, 33) to output corresponding information of the failure when processed by the CPU (34) and a relevant software program, whereby a warning message for the failure of an operation or the device of a vehicle is sent out.

10. A multi-function alarm system for vehicle, comprising a host unit (12) and at least one extension unit (11),
wherein the host unit (12) at least comprises:
a central processing unit (CPU) (34);
an acceleration sensor (39);
an acceleration processor CPU (38);
an RF transceiver (31);
a power supply regulator (37);
a warning light (30),
an instruction control (35); and
an output unit (32, 33);
further wherein the acceleration sensor (39) is connected to the CPU (34) through the acceleration processor CPU (38), an input end of the power supply regulator (37) is connected to a power supply controlled by a key of the vehicle while an output end of the same is connected to the CPU (34), and the RF transceiver (31) is also connected to the CPU (34) for receiving instructions and communicating with the at least one extension unit, the instruction control (35) is connected to the CPU (34) and controls the output unit (32, 33) for repetitively display or play the recorded data, and the warning light (30) is connected to the CPU (34) and flashes in a given frequency when receiving a signal for turning on a light from the CPU (34);
wherein the at least one extension unit at least comprises:
a central processing unit (CPU) (24);
a sound wave sensor (23);
a transmission module (25);
power supply means (26, 27), said power supply means further comprises a reverse power supply (27) and a dynamic-state sensor (26), wherein said dynamic-state sensor controls operation of the reverse power supply (27) so as to discontinuously supply power to the CPU (24) of the least one extension unit during the run of the vehicle;
a pressure sensor (21); and
a temperature sensor (22);
further wherein the sound wave sensor (23) is connected to the CPU (24) for transmitting detection signals to the CPU (24) under the control of the CPU (24), the power supply means (26, 27) is connected to the CPU (24) for supplying power to the at least one extension unit, the transmission module (25) is connected to the CPU (24) for transmitting the detected data to the host unit (12), the pressure sensor (21) is connected to the CPU (24) for transmitting data to the host unit through the transmission module (25) when a detected tire pressure value offsets a preset pressure reference, and the temperature sensor (22) is for transmitting data to the host unit through the transmission module (25) when a detected tire temperature value offsets a preset temperature reference; and wherein detection of tires, devices and high deceleration are performed during the run of a vehicle, and when abnormal conditions, if any, are detected, the at least one extension unit transfers relevant data to the host unit which then analyzes and processes data from the acceleration processor and sends out warning messages.

11. The system according to claim 10, wherein said dynamic-state sensor (26) is a cylindrical metal tube, inside a center of which is a spring fixed by an insulator from each end of which two poles are respectively led out; in static state, the metal tube is disconnected from the spring, while in dynamic state, a mechanism composed of the cylindrical metal tube and the spring is discontinuously conductive.

12. The system according to claim 10, wherein said output unit (32, 33) comprises a voice module (32) and a display module (33), the two of which are respectively connected to the CPU (34) for outputting said warning message in either sound and/or text.

13. The system according to claim 12, wherein said voice module (32) comprises solid-state recording devices to record sound that reads out relevant data and announces said warning message, whereby a sound database is formed in said voice module that is able to synthesize hundreds of sentences.

14. A multi-function alarm system for vehicle, comprising a host unit (12) and at least one extension unit (11), wherein the host unit (12) at least comprises:
a central processing unit (CPU) (34);
an acceleration sensor (39);
an acceleration processor CPU (38);
an RF transceiver (31);
a power supply regulator (37);
a warning light (30),
an instruction control (35;) and
an output unit (32, 33);
further wherein the acceleration sensor (39) is connected to the CPU (34) through the acceleration processor CPU (38), an input end of the power supply regulator (37) is connected to a power supply controlled by a key of the vehicle while an output end of the same is connected to the CPU (34), and the RF transceiver (31) is also connected to the CPU (34) for receiving instructions and communicating with the at least one extension unit, the instruction control (35) is connected to the CPU (34) and controls the output unit (32, 33) for repetitively display or play the recorded data, and the warning light (30) is connected to the CPU (34) and flashes in a given frequency when receiving a signal for turning on a light from the CPU (34); wherein the at least one extension unit at least comprises:
a central processing unit (CPU) (24);
a sound wave sensor (23);
a transmission module (25);
power supply means (26, 27);
a pressure sensor (21); and
a temperature sensor (22);
further wherein the sound wave sensor (23) is connected to the CPU (24) for transmitting detection signals to the CPU (24) under the control of the CPU (24), the power supply means (26, 27) is connected to the CPU (24) for supplying power to the at least one extension unit, the transmission module (25) is connected to the CPU (24) for transmitting detected data to the host unit (12), the pressure sensor (21) is connected to the CPU (24) for transmitting data to the host unit (12) through the transmission module (25) when a detected tire pressure value offsets a preset pressure reference, and the temperature sensor (22) is for transmitting data to the host unit through the transmission module (25) when a detected tire temperature value offsets a preset temperature reference; wherein detection of tires, devices and high deceleration are performed during the run of a vehicle, and when abnormal conditions, if any, are detected, the at least one extension unit transfers relevant data to the host unit (12) which then analyzes and processes data from the acceleration processor and sends out warning messages; and wherein said host unit (12) further comprises a vehicle failure level input end (36) which is connected to positive poles of indicator lights respectively warning failures of high temperature of water, handbrake-on, lack of gas, and door-open; further in response to any of said failures, a high level signal is output from the positive pole of the relevant indicator light, which controls the output unit (32, 33) to output corresponding information of the failure when processed by the CPU (34) and relevant software program, whereby a warning message for the failure of an operation or device of a vehicle is sent out.

15. A warning method for a multi-function alarm system for vehicle, comprising the following steps:
(a) setting various parameters for a host unit (12) and an at least one extension unit (11) and initializing a reference tire pressure for a tire provided with the at least one extension unit (11) after the vehicle is started;
(b) enabling a CPU (24) of the at least one extension unit (11) to periodically access at least one of the a pressure sensor (21), a temperature sensor (22) and a sound wave sensor (23) and then analyze the accessed data so as to control a transmission module (25) to transmit the data to the host unit (12) when the data is found abnormal; and
(c) enabling the host unit (12) to receive the data from the at least one extension unit (11) and analyze data respectively from an acceleration processor CPU (38) and a vehicle failure level input end so as to control an output unit (32, 33) to send out a warning message when the data received is found abnormal; and
(d) according to which the host unit (12) controls the following functions through corresponding keys on an instruction control (35): repeatedly displaying text data, repeatedly playing sound data, manually turning on/off a warning light (30), and selecting tire sequence numbers.

16. The method according to claim 15, wherein said step (a) further comprises a substep in which a CPU (34) of the host unit (12) writes pressure data measured at the first 2-4 times by each extension unit to a memory, further wherein the written data is used as reference pressures for corresponding tires.

17. The method according to claim 16, wherein said pressure data of each tire is measured three times.

18. The method according to claim 17, further comprising a step according to which an acceleration sensor (39) with high sensibility of the host unit (12) dynamically monitors a high deceleration failure through the acceleration processor CPU (38) and relevant software programs, and sends abnormal signals, if any, to CPU (34) that controls a RF transceiver (31) and the warning light (30) to warn a following vehicle, further wherein the warning is canceled when the failure is removed.

19. The method according to claim 16, further comprising a step according to which the CPU (24) of the at least one extension unit (11) switches from a standby state to a working state every second utilizing a watch dog; in the working state, the CPU accesses the pressure sensor (21), the temperature sensor (22) and the sound wave sensor (23) respectively so as to detect whether the data therefrom are within a normal range, and controls the transmission module (25) to send said warning messages to the host unit (12) when abnormal data is detected.

20. The method according to claim 15, wherein a self-detection step follows said step (a), such that each extension unit (11) transfers a pressure data to the host unit (12) for self-detection during the first several starting minutes of the vehicle.

21. The method according to claim 15, further comprising a step according to which a reverse power supply (27) of the at least one extension unit (11) still supplies power for a delayed time period after the vehicle stops; thereafter, the power supply is stopped.

22. The method according to claim 15, further comprising a step according to which the at least one extension unit (11) transmits vibration signals of the detected tire to the CPU (24) of the at least one extension unit which further compares the received vibration signals with prestored data so as to determine whether the tire is loose, and for a tire loose, the CPU (24) of the at least one extension unit controls the transmission module (25) to send high speed warning data to the host unit (12) for the detection of a tire loose failure.

23. The method according to claim 15, wherein said output unit (32, 33) comprises a voice module (32) and a display module (33), the two of which are respectively connected to a CPU (34) of the host unit (12) for outputting warning messages in either sound or text.

24. The method according to claim 23 further comprises a step according to which the voice module (32) sends out voice alarms of different dangers, pressure data and temperature data under the control of the CPU (34) of the host unit (12) and relevant software programs to the driver.

\* \* \* \* \*

UNITED STATES PATENT AND TRADEMARK OFFICE
CERTIFICATE OF CORRECTION

PATENT NO.         : 7,557,693 B2
APPLICATION NO. : 10/557261
DATED                  : July 7, 2009
INVENTOR(S)        : Susheng Zhu It is certified that error appears in the above-identified patent and that said Letters Patent is hereby corrected as shown below:

In claim 15, Column 18, line 38, after "of" please delete "the".

Signed and Sealed this

Tenth Day of November, 2009

David J. Kappos
*Director of the United States Patent and Trademark Office*